United States Patent
Saito

(10) Patent No.: US 12,109,780 B2
(45) Date of Patent: Oct. 8, 2024

(54) CARRIER GLASS AND METHOD FOR PRODUCING SAME

(71) Applicant: Nippon Electric Glass Co., Ltd., Shiga (JP)

(72) Inventor: Atsuki Saito, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 233 days.

(21) Appl. No.: 16/607,403

(22) PCT Filed: Apr. 24, 2018

(86) PCT No.: PCT/JP2018/016539
§ 371 (c)(1),
(2) Date: Oct. 23, 2019

(87) PCT Pub. No.: WO2018/199059
PCT Pub. Date: Nov. 1, 2018

(65) Prior Publication Data
US 2020/0130325 A1    Apr. 30, 2020

(30) Foreign Application Priority Data

Apr. 27, 2017 (JP) ................................. 2017-088071

(51) Int. Cl.
*B32B 17/10*      (2006.01)
*C03B 17/06*      (2006.01)
*C03C 3/087*      (2006.01)

(52) U.S. Cl.
CPC ........ *B32B 17/10018* (2013.01); *B32B 17/10* (2013.01); *C03B 17/06* (2013.01); *C03C 3/087* (2013.01); *B32B 2250/02* (2013.01); *B32B 2457/206* (2013.01)

(58) Field of Classification Search
None
See application file for complete search history.

(56) References Cited

U.S. PATENT DOCUMENTS

| 2009/0275462 A1* | 11/2009 | Murata .................. C03C 4/0092 501/66 |
| 2014/0179510 A1* | 6/2014 | Allan ...................... C03C 3/091 501/67 |
| 2016/0039710 A1 | 2/2016 | Tokunaga et al. |
| 2016/0121583 A1* | 5/2016 | Edwards .................. C03C 8/24 65/36 |
| 2016/0159685 A1 | 6/2016 | An et al. |
| 2016/0368815 A1 | 12/2016 | Hayashi et al. |
| 2017/0183254 A1* | 6/2017 | Akiba ..................... C03C 3/087 |
| 2018/0044223 A1 | 2/2018 | Hayashi |
| 2018/0122838 A1* | 5/2018 | Ono .......................... B32B 7/12 |
| 2018/0148367 A1* | 5/2018 | Hayashi .................. H01L 51/50 |
| 2020/0130325 A1 | 4/2020 | Saito |

FOREIGN PATENT DOCUMENTS

| CN | 106103369 | 11/2016 | |
| DE | 10307422 B4 * | 8/2008 | ............. C03C 3/064 |
| JP | 2006036626 A * | 2/2006 | ............. C03C 3/093 |
| JP | 2015-34122 | 2/2015 | |
| JP | 2016-530195 | 9/2016 | |
| JP | 2016-183091 | 10/2016 | |
| WO | 2014/175215 | 10/2014 | |
| WO | WO-2016194693 A1 * | 12/2016 | ............. C03C 15/00 |
| WO | 2017/006801 | 1/2017 | |
| WO | 2018/199059 | 11/2018 | |

OTHER PUBLICATIONS

International Preliminary Report on Patentability issued Oct. 29, 2019 in International (PCT) Application No. PCT/JP2018/016539.
International Search Report issued Jul. 31, 2018 in International (PCT) Application No. PCT/JP2018/016539.
Chinese Office Action issued Oct. 26, 2023 in corresponding Chinese Patent Application No. 202211050398.0, with English translation.
Notice of Reasons for Refusal dated Jul. 26, 2023 in corresponding Japanese Patent Application No. 2022-173042, with English-language translation.

* cited by examiner

*Primary Examiner* — David Sample
(74) *Attorney, Agent, or Firm* — Wenderoth, Lind & Ponack, L.L.P.

(57) ABSTRACT

A carrier glass of the present invention is a carrier glass for carrying an organic resin substrate, wherein the carrier glass has a flat sheet shape having a thickness of from 0.1 mm to 1.2 mm, wherein the carrier glass has a content of iron in glass in terms of $Fe_2O_3$ of from 45 ppm by mass to 130 ppm by mass, and wherein the carrier glass has a transmittance at a wavelength of 308 nm in a thickness direction of from 71% to 81%.

17 Claims, No Drawings

CARRIER GLASS AND METHOD FOR PRODUCING SAME

TECHNICAL FIELD

The present invention relates to a carrier glass and a method of manufacturing the same, and more specifically, to a carrier glass for carrying an organic resin substrate and a method of manufacturing the same.

BACKGROUND ART

An electronic device, such as an OLED display, is used in applications such as displays of cellular phones because the electronic device is thin, is excellent in displaying a moving image, and has low power consumption. Currently, a glass sheet is widely used as a substrate of the OLED display.

In recent years, attention has been focused on producing a flexible OLED display using an organic resin substrate as a substrate. However, the organic resin substrate has flexibility, and hence it is difficult to directly form a semiconductor film on the organic resin substrate. Therefore, it is required to perform a step of forming a semiconductor film on the organic resin substrate under a state in which the organic resin substrate is laminated on a carrier glass.

The carrier glass of this application is required to satisfy the following characteristics (1) and (2).
(1) To have a small content of an alkali metal oxide in order to prevent a situation in which an alkali ion is diffused in a heat treatment step into a semiconductor film having been formed into a film.
(2) To be excellent in productivity, for example, be excellent in meltability, fining property, and devitrification resistance.

In addition, the OLED display using the organic resin substrate is mainly used for a mobile terminal, such as a smart phone, and is hence required to have high resolution. Therefore, low temperature poly-silicon (LTPS) or an oxide semiconductor is used for a thin film transistor for driving the display.

In general, the organic resin substrate has low heat resistance, and hence cannot maintain its function, for example, through a heat treatment step at high temperature in which LTPS is produced. However, when the organic resin substrate is supported by the carrier glass, some resins (e.g., a heat-resistant resin, such as polyimide) can be subjected to heat treatment without being impaired in their functions.

Under the above-mentioned circumstances, the carrier glass of this application is also required to satisfy the following characteristic (3): to have high heat resistance. Specifically, it is required that a dimensional change is less liable to occur through heat treatment at about 600° C. When a dimensional change occurs in the carrier glass, for example, through the heat treatment step at high temperature in which LIPS is produced, it becomes difficult to produce a transistor structure with high definition on the organic resin substrate.

CITATION LIST

Patent Literature 1: JP 2016-530195 A

SUMMARY OF INVENTION

Technical Problem

Incidentally, when the carrier glass and the organic resin substrate are separated after the semiconductor film is formed on the organic resin substrate, a laser at a wavelength of 308 nm is used. Therefore, in addition to the above-mentioned demand characteristics (1) to (3), the carrier glass is also required to satisfy the following characteristic (4): to have a high transmittance at a wavelength of 308 nm in order to increase the utilization efficiency of the laser.

The transmittance at a wavelength of 308 nm is significantly affected by iron serving as an impurity in glass. That is, $Fe^{3+}$ present in the glass shows absorption around a wavelength of 308 nm, and hence when the content of $Fe^{3+}$ is large, the transmittance at a wavelength of 308 nm is reduced. Therefore, in order to satisfy the demand characteristic (4), it is important that the content of $Fe^{3+}$ present in the glass be reduced to the extent possible.

However, $Fe_2O_3$ is a component which acts as a fining agent. When the content of $Fe_2O_3$ is extremely reduced, a fining effect becomes insufficient. As a result, a bubble defect is liable to occur, and the productivity of the carrier glass is reduced. In particular, when the strain point of the carrier glass is increased in order to increase heat resistance, an increase in melting temperature occurs, and the above-mentioned problem is liable to occur remarkably.

The present invention has been made in view of the above-mentioned circumstances, and a technical object of the present invention is to devise a carrier glass which has a high transmittance at a wavelength of 308 nm, and besides, is excellent in productivity (particularly fining property).

Solution to Problem

The inventor of the present invention has repeated various experiments, and as a result, has found that the above-mentioned technical object can be achieved by strictly restricting the content of iron in glass and a transmittance in an ultraviolet region. Thus, the finding is proposed as the present invention. That is, according to one embodiment of the present invention, there is provided a carrier glass for carrying an organic resin substrate, wherein the carrier glass has a flat sheet shape having a thickness of from 0.1 mm to 1.2 mm, wherein the carrier glass has a content of iron in glass in terms of $Fe_2O_3$ of from 45 ppm by mass to 130 ppm by mass, and wherein the carrier glass has a transmittance at a wavelength of 308 nm in a thickness direction of from 71% to 81%. Herein, the "transmittance at a wavelength of 308 nm in a thickness direction" refers to an internal transmittance calculated by the following equation 1, and may be measured, for example, with UV-3100PC manufactured by Shimadzu Corporation. The "in terms of" means that, even when an oxide has a valence different from that of the explicit oxide, such oxide is treated by being converted into the explicit oxide.

$$\log T_{in} = \log(I_1/I_0) - \log R$$

$\log T_{in}$: internal transmittance (%)

$I_0$: intensity (%) of incident light $I_1$: intensity (%) of light after transmitting through a specific optical path length $R$: attenuation rate (%) of light through reflection In addition, it is preferred that the carrier glass according to the embodiment of the present invention have a content of $Li_2O+Na_2O+K_2O$ in a glass composition of less than 0.20 mass %. Herein, the content of "$Li_2O+Na_2O+K_2O$" refers to the total content of $Li_2O$, $Na_2O$, and $K_2O$.

In addition, it is preferred that the carrier glass according to the embodiment of the present invention have a β-OH value of 0.20/mm or less. Herein, the "β-OH value" is a value calculated by the following equation 2 with an FT-IR.

β-OH value=$(1/X)\log(T_1/T_2)$

X: Thickness (mm)
$T_1$: Transmittance (%) at a reference wavelength of 3,846 cm$^{-1}$
$T_2$: Minimum transmittance (%) at a wavelength around a hydroxyl group absorption wavelength of 3,600 cm$^{-1}$ In addition, it is preferred that the carrier glass according to the embodiment of the present invention comprise as a glass composition, in terms of mass % on a basis of the following oxides, 55% to 65% of $SiO_2$, 15% to 23% of $Al_2O_3$, 0% to 7% of $B_2O_3$, 0% to less than 0.20% of $Li_2O+Na_2O+K_2O$, 0% to 6% of MgO, 0.1% to 10% of CaO, 0% to 10% of SrO, 0% to 13% of BaO, 60 ppm to 130 ppm of $Fe_2O_3$, 0% to less than 0.010% of $As_2O_3$, and 0% to less than 0.010% of $Sb_2O_3$.

In addition, it is preferred that the carrier glass according to the embodiment of the present invention have a thermal compaction rate of 20 ppm or less when the carrier glass is increased in temperature from normal temperature at a rate of 5° C./min, kept at 500° C. for 1 hour, and decreased in temperature at a rate of 5° C./min. Herein, the "thermal compaction rate" is calculated as described below. First, a sample is marked with a linear mark at a predetermined position, and then bent perpendicular to the mark to be divided into two glass pieces. Next, one of the glass pieces is subjected to predetermined heat treatment (the glass piece is increased in temperature from normal temperature at a rate of 5° C./min, kept at 500° C. for 1 hour, and decreased in temperature at a rate of 5° C./min). After that, the glass piece having been subjected to the heat treatment and another glass piece not having been subjected to the heat treatment are arranged next to each other, and are fixed with an adhesive tape T. Then, a shift between the marks is measured. The thermal compaction rate is calculated by the expression $\Delta L/L_0$ (unit: ppm) when the shift between the marks is represented by $\Delta L$ and the length of the sample before the heat treatment is represented by $L_0$.

In addition, it is preferred that the carrier glass according to the embodiment of the present invention have a liquidus temperature of 1,300° C. or less. Herein, the "liquidus temperature" may be calculated by measuring a temperature at which a crystal precipitates when glass powder which has passed through a standard 30-mesh sieve (500 μm) and remained on a 50-mesh sieve (300 μm) is placed in a platinum boat and then kept for 24 hours in a gradient heating furnace.

In addition, it is preferred that the carrier glass according to the embodiment of the present invention have a temperature at a viscosity at high temperature of $10^{2.5}$ dPa·s of 1,700° C. or less. Herein, the "temperature at a viscosity at high temperature of $10^{2.5}$ dPa·s" may be measured by a platinum sphere pull up method.

It is preferred that a glass-resin laminate according to one embodiment of the present invention comprise a carrier glass and an organic resin substrate laminated on each other, wherein the carrier glass comprises the above-mentioned carrier glass.

According to one embodiment of the present invention, there is provided a method of manufacturing a carrier glass for carrying an organic resin substrate, the method comprising: a blending step of blending a glass batch so as to obtain a glass comprising as a glass composition, in terms of mass % on a basis of the following oxides, 55% to 65% of $SiO_2$, 15% to 23% of $Al_2O_3$, 0% to 7% of $B_2O_3$, 0% to less than 0.20% of $Li_2O+Na_2O+K_2O$, 0% to 6% of MgO, 0.1% to 10% of CaO, 0% to 10% of SrO, 0% to 13% of BaO, 45 ppm by mass to 130 ppm by mass of $Fe_2O_3$, 0% to less than 0.010% of $As_2O_3$, and 0% to less than 0.010% of $Sb_2O_3$, and having a transmittance at a wavelength of 308 nm in a thickness direction of from 71% to 81%; a melting step of heating the blended glass batch through application of a current with a heating electrode to obtain molten glass; and a forming step of forming the obtained molten glass into a flat sheet shape having a thickness of from 0.1 mm to 1.2 mm by an overflow down-draw method. Herein, the "overflow down-draw method" refers to a method in which molten glass is caused to overflow from both sides of a heat-resistant, trough-shaped structure, and the overflowing molten glasses are subjected to down-draw downward at the lower end of the trough-shaped structure while being joined, to thereby form a glass sheet.

In addition, it is preferred that, in the method of manufacturing a carrier glass according to the embodiment of the present invention, the blending a glass batch be performed so that a content (total content) of iron derived from a raw material for introducing MgO and a raw material for introducing CaO is from 30 ppm by mass to 70 ppm by mass in terms of $Fe_2O_3$.

DESCRIPTION OF EMBODIMENTS

A carrier glass of the present invention has a thickness of from 0.1 mm to 1.2 mm, preferably from 0.2 mm to 1.0 mm or from 0.3 mm to 0.7 mm, particularly preferably from 0.4 mm to 0.6 mm. When the thickness is too small, the carrier glass has a difficulty in exhibiting its function owing to an increase in flexibility. Meanwhile, when the thickness is too large, the transmittance of the carrier glass at a wavelength of 308 nm in a thickness direction is liable to be reduced. The thickness may be adjusted, for example, by a flow rate or a sheet-drawing speed at the time of manufacture of the glass.

$Fe_2O_3$ is a component which exhibits a fining effect in a high temperature region around 1,600° C., but is also a component which reduces the transmittance in an ultraviolet region. The carrier glass of the present invention has a content of iron in glass in terms of $Fe_2O_3$ of from 45 ppm by mass to 130 ppm by mass, preferably from 60 ppm by mass to 125 ppm by mass or from 80 ppm by mass to 120 ppm by mass, particularly preferably from 90 ppm by mass to 110 ppm by mass, most preferably from 95 ppm by mass to 105 ppm by mass. When the content of iron in the glass is too small, a bubble defect is liable to occur, and the productivity of the carrier glass is liable to be reduced. Meanwhile, when the content of iron in the glass is too large, the transmittance at a wavelength of 308 nm is reduced, and hence it becomes difficult to separate the carrier glass and an organic resin substrate from each other with a laser at a wavelength of 308 nm.

The carrier glass of the present invention has a transmittance at a wavelength of 308 nm in a thickness direction of from 71% to 81%, preferably from 71% to 79%, from 72% to 78%, or from 73% to 77%, particularly preferably from 74% to 76%. When the transmittance at a wavelength of 308 nm in the thickness direction is low, it becomes difficult to separate the carrier glass and the organic resin substrate from each other with a laser at a wavelength of 308 nm. Meanwhile, when the transmittance at a wavelength of 308 nm in the thickness direction is high, it becomes difficult to exhibit the fining effect of $Fe_2O_3$.

The carrier glass of the present invention has a β-OH value of preferably 0.20/mm or less, 0.16/mm or less, 0.13/mm or less, 0.12/mm or less, or 0.10/mm or less, particularly preferably less than 0.10/mm. When the β-OH value is too high, heat resistance is liable to be reduced. Meanwhile, when the β-OH value is too low, meltability is liable to be reduced. Therefore, the β-OH value is preferably 0.01/mm or more, particularly preferably 0.02/mm or more.

A method of reducing the β-OH value is exemplified by the following methods (1) to (7). Of those, the methods (1) to (4) are effective. (1) A method involving selecting raw materials having low water contents. (2) A method involving adding a desiccant, such as Cl or $SO_3$, into a glass batch. (3) A method involving performing heating through application of a current with a heating electrode. (4) A method involving adopting a small melting furnace. (5) A method involving reducing the water content in a furnace atmosphere. (6) A method involving performing $N_2$ bubbling in molten glass. (7) A method involving increasing the flow rate of molten glass.

The carrier glass of the present invention has a content of $Li_2O+Na_2O+K_2O$ in a glass composition of preferably less than 0.20 mass %, less than 0.10 mass %, or less than 0.08 mass %, particularly preferably less than 0.06 mass %. Meanwhile, when $Li_2O$, $Na_2O$, and $K_2O$ are introduced in a small amount, the glass is easily melted by heating through application of a current with a heating electrode because of a reduction in electrical resistivity of molten glass. Therefore, the total content of $Li_2O$, $Na_2O$, and $K_2O$ and the content of each of $Li_2O$, $Na_2O$, and $K_2O$ are preferably 0.01 mass % or more, 0.02 mass % or more, 0.03 mass % or more, or 0.04 mass % or more, particularly preferably 0.05 mass % or more. In comprehensive consideration of effects on the semiconductor film and a reduction in electrical resistivity, it is preferred to preferentially introduce $Na_2O$ out of $Li_2O$, $Na_2O$, and $K_2O$.

It is preferred that the carrier glass of the present invention comprise as a glass composition, in terms of mass % on the basis of the following oxides, 55% to 65% of $SiO_2$, 15% to 23% of $Al_2O_3$, 0% to 7% of $B_2O_3$, 0% to less than 0.20% of $Li_2O+Na_2O+K_2O$, 0% to 6% of MgO, 0.1% to 10% of CaO, 0% to 10% of SrO, 0% to 13% of BaO, 60 ppm to 130 ppm of $Fe_2O_3$, 0% to less than 0.010% of $As_2O_3$, and 0% to less than 0.010% of $Sb_2O_3$.

$SiO_2$ is a component which forms a glass skeleton and increases a strain point. The content of $SiO_2$ is preferably from 55% to 65% or from 58% to 65%, particularly preferably from 59% to 62%. When the content of $SiO_2$ is small, the strain point or acid resistance is liable to be reduced, and a density is liable to be increased. Meanwhile, when the content of $SiO_2$ is large, a viscosity at high temperature is increased, and thus the meltability is liable to be reduced. Besides, a glass component balance is lost, and thus a devitrified crystal, such as cristobalite, precipitates, with the result that a liquidus temperature is liable to be increased.

$Al_2O_3$ is a component which increases the strain point. Further, $Al_2O_3$ is also a component which increases a Young's modulus. The content of $Al_2O_3$ is preferably from 15% to 23%, from 16% to 22%, from 17% to 22%, from 18% to 22%, or from 18.6% to 21%, particularly preferably from 19.2% to 21%. When the content of $Al_2O_3$ is small, the strain point or a specific Young's modulus is liable to be reduced. Meanwhile, when the content of $Al_2O_3$ is large, mullite or a feldspar-based devitrified crystal precipitates, with the result that the liquidus temperature is liable to be increased.

$B_2O_3$ is a component which increases the meltability and devitrification resistance. The content of $B_2O_3$ is preferably from 0% to 7%, from 0% to 6%, from 0.1% to less than 3.0%, or from 0.3% to 2%, particularly preferably from 0.5% to 0.75%. When the content of $B_2O_3$ is small, the meltability is liable to be reduced, and the liquidus temperature is liable to be increased. Further, buffered hydrofluoric acid resistance (BHF resistance) is liable to be reduced. Meanwhile, when the content of $B_2O_3$ is large, the strain point and the specific Young's modulus are liable to be reduced. When the strain point is to be increased to the extent possible, the content of $B_2O_3$ is preferably from 0% to less than 1.0%, particularly preferably from 0% to less than 0.50%.

Preferred ranges of the contents of $Li_2O$, $Na_2O$, and $K_2O$ are as described above.

MgO is a component which increases the meltability and the Young's modulus. The content of MgO is preferably from 0% to 6%, from 0.01% to 6%, from 1% to 6%, from 2% to 5%, or from 2.5% to 4.5%, particularly preferably from 3% to 4%. When the content of MgO is small, the Young's modulus and the meltability are liable to be reduced. Meanwhile, when the content of MgO is large, a devitrified crystal derived from Mg or Ba, such as mullite, and a devitrified crystal of cristobalite are liable to precipitate, and the strain point is liable to be reduced.

CaO is a component which reduces the viscosity at high temperature and thus remarkably increases the meltability without reducing the strain point. In addition, a raw material for introducing CaO is relatively inexpensive among those for alkaline earth metal oxides, and hence CaO is a component which achieves a reduction in raw material cost. Further, CaO is also a component which increases the Young's modulus. In addition, CaO also has a suppressing effect on the precipitation of the devitrified crystal containing Mg. The content of CaO is preferably from 0.1% to 10%, from 1% to 9%, from 2% to 8%, from 3% to 7%, or from 3.5% to 6%, particularly preferably from 3.5% to 5.5%. When the content of CaO is small, it becomes difficult to exhibit the above-mentioned effects. Meanwhile, when the content of CaO is large, a devitrified crystal of anorthite is liable to precipitate, and the density is liable to be increased.

SrO is a component which suppresses phase separation and increases the devitrification resistance. Further, SrO is also a component which reduces the viscosity at high temperature and thus increases the meltability without reducing the strain point. However, when the content of SrO is large, a feldspar-based devitrified crystal is liable to precipitate, and the devitrification resistance is liable to be reduced contrarily. Further, there is a tendency that the density is increased or the Young's modulus is reduced. Therefore, the content of SrO is preferably from 0% to 10%, from 0% to 8%, from 0% to 3%, or from 0.1% to 2%, particularly preferably from 0.5% to less than 1.0%.

BaO is a component which has a high suppressing effect on the precipitation of a mullite-based or anorthite-based devitrified crystal, among alkaline earth metal oxides. The content of BaO is preferably from 0% to 13%, from 0.1% to 12%, from 1% to 11%, or from 5% to 10.7%, particularly preferably from 8% to 10.5%. When the content of BaO is small, the mullite-based or anorthite-based devitrified crystal is liable to precipitate. Meanwhile, when the content of BaO is large, the density is liable to be increased and the Young's modulus is liable to be reduced. In addition, the viscosity at high temperature is excessively increased, and thus the meltability is liable to be reduced.

The alkaline earth metal oxides are each an extremely important component for increasing the strain point, the devitrification resistance, and the meltability. When the content of the alkaline earth metal oxides is small, the strain point is increased. However, it becomes difficult to suppress the precipitation of an $Al_2O_3$-based devitrified crystal. In addition, the viscosity at high temperature is increased, and thus the meltability is liable to be reduced. Meanwhile, when the content of the alkaline earth metal oxides is large, the meltability is improved. However, the strain point is liable to be reduced. In addition, there is a risk in that the liquidus viscosity is reduced owing to a reduction in viscosity at high temperature. Therefore, the content of MgO+CaO+SrO+BaO (the total content of MgO, CaO, SrO, and BaO) is preferably from 16% to 22%, from 17% to 20%, or from 17.5% to 19.5%, particularly preferably from 18% to 19.3%.

The ratio of (MgO+CaO+SrO+BaO)/$Al_2O_3$ in terms of mass % is an important component ratio for reducing the liquidus viscosity through suppression of the precipitation of various devitrified crystals. When the ratio of (MgO+CaO+SrO+BaO)/$Al_2O_3$ in terms of mass % is small, the liquidus temperature of mullite is liable to be increased. Meanwhile, when the ratio of (MgO+CaO+SrO+BaO)/$Al_2O_3$ in terms of mass % is large, the alkaline earth metal oxides are relatively increased, and a feldspar-based devitrified crystal or an alkaline earth metal-containing devitrified crystal is liable to precipitate. Therefore, the ratio of (MgO+CaO+SrO+BaO)/$Al_2O_3$ in terms of mass % is preferably from 0.75 to 1.40, from 0.80 to 1.20, from 0.84 to 1.15, or from 0.94 to 1.13, particularly preferably from 0.94 to 1.05.

Preferred ranges of the content of $Fe_2O_3$ are as described above.

$As_2O_3$ and $Sb_2O_3$ are each a component which causes the glass to be colored when the glass is melted by heating through application of a current with a heating electrode without heating with a combustion flame of a burner. The content of each of $As_2O_3$ and $Sb_2O_3$ is preferably less than 0.010%, particularly preferably less than 0.0050%.

Other than the above-mentioned components, for example, the following components may be added to the glass composition. From the viewpoint of exhibiting the effects of the present invention appropriately, the total content of the components other than the above-mentioned components is preferably 5% or less, particularly preferably 3% or less.

ZnO is a component which increases the meltability. However, when ZnO is contained in a large amount, the glass is liable to devitrify, and in addition, the strain point is liable to be reduced. The content of ZnO is preferably from 0% to 5%, from 0% to 3%, or from 0% to 0.5%, particularly preferably from 0% to 0.2%.

$P_2O_5$ is a component which increases the strain point. However, when $P_2O_5$ is contained in a large amount, the glass is liable to undergo phase separation. The content of $P_2O_5$ is preferably from 0% to 1.5% or from 0% to 1.2%, particularly preferably from 0% to 1%.

$TiO_2$ is a component which reduces the viscosity at high temperature and thus increases the meltability, and is also a component which suppresses solarisation. However, when $TiO_2$ is contained in a large amount, the glass is colored, and thus a transmittance is liable to be reduced. Therefore, the content of $TiO_2$ is preferably from 0% to 3%, from 0% to 1%, or from 0% to 0.1%, particularly preferably from 0% to 0.02%.

$Y_2O_3$, $Nb_2O_5$, and $La_2O_3$ each have an action of increasing the strain point, a Young's modulus, and the like. However, when the contents of those components are too large, a density and the raw material cost are liable to be increased. Therefore, the content of each of $Y_2O_3$, $Nb_2O_5$, and $La_2O_3$ is preferably from 0% to 3%, from 0% to 1%, or from 0% to less than 0.10%, particularly preferably from 0% to less than 0.05%.

Cl is a component which acts as a desiccant and thus reduces a β-OH value. Therefore, when Cl is introduced, the lower limit of the content of Cl is preferably 0.001% or more or 0.003% or more, particularly preferably 0.005% or more. However, when the content of Cl is too large, the strain point is liable to be reduced. Therefore, the lower limit of the content of Cl is preferably 0.5% or less or 0.2% or less, particularly preferably 0.08% or less. An alkaline earth metal chloride, such as strontium chloride, aluminum chloride, or the like may be used as a raw material for introducing Cl.

$SO_3$ is a component which acts as a desiccant and thus reduces a β-OH value. Therefore, when $SO_3$ is introduced, the lower limit of the content of $SO_3$ is preferably 0.0001% or more, particularly preferably 0.0005% or more. However, when the content of $SO_3$ is too large, reboil bubbles are liable to be generated. Therefore, the lower limit of the content of $SO_3$ is preferably 0.05% or less, 0.01% or less, or 0.005% or less, particularly preferably 0.001% or less.

$SnO_2$ is a component which exhibits a satisfactory fining action in a high temperature region. In addition, $SnO_2$ is a component which increases the strain point, and is also a component which reduces the viscosity at high temperature. The content of $SnO_2$ is preferably from 0% to 1%, from 0.001% to 1%, or from 0.05% to 0.5%, particularly preferably from 0.1% to 0.3%. When the content of $SnO_2$ is too large, a devitrified crystal of $SnO_2$ is liable to precipitate. When the content of $SnO_2$ is less than 0.001%, it becomes difficult to exhibit the above-mentioned effects.

A fining agent other than $SnO_2$ may be used unless the characteristics of the glass are significantly impaired. Specifically, $CeO_2$, F, and C may be added at, for example, up to 1% in terms of their total content. Metal powders, such as Al powder and Si powder, may be added at, for example, up to 1% in terms of their total content.

The carrier glass of the present invention preferably has the following characteristics.

The strain point is preferably more than 720° C., 730° C. or more, or 740° C. or more, particularly preferably from 750° C. to 850° C. When the strain point is low, thermal compaction is liable to occur in the carrier glass in a film forming step for a semiconductor film, and hence it becomes difficult to achieve an increase in definition of an OLED display.

The thermal compaction rate is preferably 20 ppm or less, 18 ppm or less, 15 ppm or less, or 12 ppm or less, particularly preferably from 1 ppm to 10 ppm when the carrier glass is increased in temperature from normal temperature at a rate of 5° C./min, kept at 500° C. for 1 hour, and decreased in temperature at a rate of 5° C./min. When the thermal compaction rate is high, thermal compaction is liable to occur in the carrier glass in the film forming step for the semiconductor film, and hence it becomes difficult to achieve an increase in definition of the OLED display.

The average thermal expansion coefficient within a temperature range of from 30° C. to 380° C. is preferably $35 \times 10^{-7}$/° C. or more, particularly preferably from $38 \times 10^{-7}$/° C. to $41 \times 10^{-7}$/° C. When the average thermal expansion coefficient within a temperature range of from 30°

C. to 380° C. is too low, the average thermal expansion coefficient does not match the thermal expansion coefficient of the organic resin substrate, and peeling of the organic resin substrate or warpage of the carrier glass is liable to occur. Herein, the "average thermal expansion coefficient within a temperature range of from 30° C. to 380° C." refers to a value measured with a dilatometer.

The liquidus temperature is preferably 1,300° C. or less, 1,280° C. or less, or 1,260° C. or less, particularly preferably from 1,100° C. to 1,240° C. When the liquidus temperature is high, a devitrified crystal is generated during forming by an overflow down-draw method or the like, and the productivity of the carrier glass is liable to be reduced.

The viscosity at a liquidus temperature is preferably $10^{4.4}$ dPa·s or more, $10^{4.8}$ dPa·s or more, $10^{5.0}$ dPa·s or more, or $10^{5.2}$ dPa·s or more, particularly preferably from $10^{5.5}$ dPa·s to $10^{7.0}$ dPa·s. When the viscosity at a liquidus temperature is low, a devitrified crystal is generated during forming by an overflow down-draw method or the like, and the productivity of the carrier glass is liable to be reduced.

The temperature at a viscosity at high temperature of $10^{2.5}$ dPa·s is preferably 1,700° C. or less, 1,680° C. or less, 1,660° C. or less, 1,640° C. or less, or 1,630° C. or less, particularly preferably from 1,540° C. to 1,620° C. When the temperature at a viscosity at high temperature of $10^{2.5}$ dPa·s is high, it becomes difficult to melt a glass batch, which entails an increase in manufacturing cost of the carrier glass.

The specific Young's modulus is preferably more than 29.5 GPa/g·cm$^3$, 30 GPa/g·cm$^3$ or more, 30.5 GPa/g·cm$^3$ or more, 31 GPa/g·cm$^3$ or more, or 31.5 GPa/g·cm$^3$ or more, particularly preferably 32 GPa/g·cm$^3$ or more. When the specific Young's modulus is high, the carrier glass is liable to be deflected under its own weight.

It is preferred that the carrier glass of the present invention comprise a formed joined surface in a center portion in a thickness direction, that is, be formed by an overflow down-draw method. Through the forming by the overflow down-draw method, surfaces to serve as the surfaces of the glass are formed in a state of free surfaces without being brought into contact with a trough-shaped refractory. As a result, a glass sheet having satisfactory surface quality can be manufactured at low cost without polishing. In addition, the overflow down-draw method also has the advantage of easy forming of a glass sheet having a small thickness.

It is preferred that a glass-resin laminate of the present invention comprise a carrier glass and an organic resin substrate laminated on each other, wherein the carrier glass comprises the above-mentioned carrier glass. In addition, the carrier glass and the organic resin substrate are preferably integrated with each other via an adhesive. The technical features of the glass-resin laminate of the present invention overlap with the technical features of the carrier glass of the present invention. In this description, the detailed description of the overlapping portions is omitted for convenience.

A method of manufacturing a carrier glass of the present invention is a method of manufacturing a carrier glass for carrying an organic resin substrate, the method comprising: a blending step of blending a glass batch so as to obtain a glass comprising as a glass composition, in terms of mass % on a basis of the following oxides, 55% to 65% of $SiO_2$, 15% to 23% of $Al_2O_3$, 0% to 7% of $B_2O_3$, 0% to less than 0.20% of $Li_2O+Na_2O+K_2O$, 0% to 6% of MgO, 0.1% to 10% of CaO, 0% to 10% of SrO, 0% to 13% of BaO, 45 ppm by mass to 130 ppm by mass of $Fe_2O_3$, 0% to less than 0.010% of $As_2O_3$, and 0% to less than 0.010% of $Sb_2O_3$, and having a transmittance at a wavelength of 308 nm in a thickness direction of from 71% to 81%; a melting step of heating the blended glass batch through application of a current with a heating electrode to obtain molten glass; and a forming step of forming the obtained molten glass into a flat sheet shape having a thickness of from 0.1 mm to 1.2 mm by an overflow down-draw method. The technical features of the method of manufacturing a carrier glass of the present invention partly overlap with the technical features of the carrier glass of the present invention. In this description, the detailed description of the overlapping portions is omitted for convenience.

In general, a manufacturing process for the carrier glass comprises a melting step, a fining step, a supplying step, a stirring step, and a forming step. The melting step is a step of melting a glass batch obtained by blending glass raw materials to provide molten glass. The fining step is a step of fining the molten glass obtained in the melting step by an action of a fining agent or the like. The supplying step is a step of transferring the molten glass from one step to another. The stirring step is a step of stirring the molten glass to homogenize the molten glass. The forming step is a step of forming the molten glass into a glass having a flat sheet shape. A step other than the above-mentioned steps, for example, a state adjusting step of adjusting the molten glass to be in a state suitable for forming may be introduced after the stirring step as required.

In order to restrict the transmittance at a wavelength of 308 nm in the thickness direction to from 71% to 79% as described above, it is important to control the content of iron in the glass. In view of the foregoing, in the method of manufacturing a carrier glass of the present invention, it is preferred that the glass batch be blended so that the content of iron in terms of $Fe_2O_3$ derived from a raw material for introducing MgO and a raw material for introducing CaO is from 30 ppm by mass to 70 ppm by mass, from 40 ppm by mass to 60 ppm by mass, or from 45 ppm by mass to 55 ppm by mass, particularly from 50 ppm by mass to 55 ppm by mass. The reason for this is as described below.

Main sources for introducing (mixing) $Fe_2O_3$ into the glass are the raw material for introducing MgO, the raw material for introducing CaO, and a raw material for introducing $Al_2O_3$, and are particularly the following two kinds: the raw material for introducing MgO and the raw material for introducing CaO. In addition, magnesium oxide or magnesium hydroxide is generally used as the raw material for introducing MgO. Calcium carbonate is generally used as the raw material for introducing CaO. Aluminum oxide or aluminum hydroxide is generally used as the raw material for introducing $Al_2O_3$.

The raw material for introducing MgO and the raw material for introducing CaO are naturally-derived raw materials, and hence are largely varied in content of iron depending on a manufacturing lot. This is partly responsible for a variation in content of iron in continuous production of the carrier glass. Therefore, as described above, when the content of iron mixed in from the raw material for introducing MgO and the raw material for introducing CaO is strictly controlled, the transmittance at a wavelength of 308 nm in the thickness direction is easily restricted within a predetermined range. Meanwhile, when the content of iron mixed in from the raw material for introducing MgO and the raw material for introducing CaO is too small, it becomes difficult to exhibit a fining effect as described below. The raw material for introducing MgO and the raw material for introducing CaO are naturally-derived raw materials, and hence even raw materials having a low content of iron are inexpensive. Therefore, the selection of those introduction raw materials in reducing the content of iron in the glass is preferred also from the viewpoint of cost.

When a low-alkali glass is produced, a raw material subjected to soda reduction treatment is generally used as the raw material for introducing $Al_2O_3$. Moreover, at the time of soda reduction treatment, iron is inevitably mixed in the raw material. Therefore, when the low-alkali glass is produced, iron is inevitably mixed in the raw material for introducing $Al_2O_3$. As the raw material for introducing $Al_2O_3$, the raw material subjected to the soda reduction treatment and a raw material not subjected to $Na_2O$ reduction treatment may be combined. In this case, however, the mixed amount of an alkali in the glass is varied, and hence there is a risk in that conditions of the heating through application of a current with a heating electrode or the characteristics of a semiconductor film are adversely affected, and hence such case is not realistic. In consideration of the above-mentioned points, it can be said to be difficult to control the content of iron in the raw material for introducing $Al_2O_3$.

Further, the raw material for introducing $Al_2O_3$ has poor solubility, and is hence poorly dissolved in the initial stage of melting. $Fe_2O_3$ in the raw material for introducing $Al_2O_3$ is introduced into molten glass in the final stage of melting, and hence does not effectively function as a fining agent. Moreover, in a multivalent oxide, such as $Fe_2O_3$, the ratio of a high valent ion becomes higher and a fining effect is exhibited more easily as the molten glass has higher optical basicity. In comprehensive consideration of the above-mentioned points, it can be said that $Fe_2O_3$ to be introduced from the raw material for introducing MgO and the raw material for introducing CaO exhibits a fining effect more easily than $Fe_2O_3$ to be mixed in from the raw material for introducing $Al_2O_3$. When MgO or CaO is introduced into the molten glass, the optical basicity of the molten glass becomes higher.

The low-alkali glass is generally melted by combustion heating with a burner. The burner is generally arranged at an upper portion of a melting kiln, and uses fossil fuel as its fuel, specifically, for example, liquid fuel, such as heavy oil, or gas fuel, such as LPG. A combustion flame may be obtained by mixing the fossil fuel and oxygen gas.

However, the combustion heating with a burner is liable to entail an increase in β-OH value of the carrier glass because a large amount of water is mixed in the molten glass. In view of the foregoing, the method of manufacturing a carrier glass of the present invention preferably comprises heating the glass batch through application of a current with a heating electrode. With this, by the heating through application of a current with a heating electrode arranged on a wall surface of the melting kiln, the temperature of the molten glass is reduced from a bottom surface of the melting kiln toward an upper surface of the melting kiln, and hence the glass batch is present under a solid state in a large amount on a liquid surface of the molten glass in the melting kiln. As a result, water having adhered to the glass batch under a solid state evaporates, and thus an increase in water content resulting from the raw material can be suppressed. Further, when the heating through application of a current with a heating electrode is performed, the amount of energy required for obtaining the molten glass per unit mass is reduced, and the amount of a melt volatile is reduced. As a result, an environmental load can be reduced.

In the method of manufacturing a carrier glass of the present invention, it is further preferred to perform the heating through application of a current with a heating electrode without performing combustion heating with a burner. When the combustion heating with a burner is performed, water to be generated during combustion of fossil fuel is liable to be mixed in the molten glass. Therefore, when the combustion heating with a burner is not performed, the β-OH value of the molten glass is easily reduced. The "perform the heating through application of a current with a heating electrode without performing combustion heating with a burner" refers to a case of continuously melting the glass batch only by heating through application of a current with a heating electrode, and for example, a case of performing combustion heating with a burner at the time of starting up of the melting kiln, and a case of locally and supplementarily performing combustion heating with a burner at a specific position of the melting kiln are excluded.

The heating through application of a current with a heating electrode is preferably performed by applying an alternating voltage to a heating electrode arranged at a bottom portion or a side portion of a melting kiln so as to be brought into contact with the molten glass in the melting kiln. A material used for the heating electrode preferably has heat resistance and corrosion resistance to the molten glass. For example, tin oxide, molybdenum, platinum, or rhodium may be used. Of those, molybdenum is particularly preferred because of having high heat resistance and a high degree of freedom of arrangement in the melting kiln.

The low-alkali glass, which has a low content of an alkali metal oxide, has a high electrical resistivity. Therefore, when the heating through application of a current with a heating electrode is applied to the low-alkali glass, there is a risk in that the current flows not only in the molten glass but also in a refractory constituting the melting kiln, with the result that the refractory is damaged early. In order to prevent such situation, it is preferred to use, as a refractory in a furnace, a zirconia-based refractory having a high electrical resistivity, particularly zirconia electrocast bricks. As described above, it is also preferred to introduce a component which reduces the electrical resistivity ($Li_2O$, $Na_2O$, $K_2O$, or the like) in the molten glass in a small amount. The content of $ZrO_2$ in the zirconia-based refractory is preferably 85 mass % or more, particularly preferably 90 mass % or more.

EXAMPLES

The present invention is hereinafter described by way of Examples.

Examples (Sample Nos. 1 to 17) of the present invention are shown in Tables 1 and 2. In the tables, the "N.A." means that the item is not measured.

TABLE 1

|  | No. 1 | No. 2 | No. 3 | No. 4 | No. 5 | No. 6 | No. 7 | No. 8 | No. 9 |
|---|---|---|---|---|---|---|---|---|---|
| Composition (mass %) | | | | | | | | | |
| $SiO_2$ | 61.58 | 61.58 | 58.70 | 61.35 | 61.12 | 61.56 | 61.80 | 61.00 | 61.74 |
| $Al_2O_3$ | 19.39 | 19.39 | 19.30 | 19.51 | 19.44 | 19.58 | 18.00 | 19.50 | 19.10 |
| $B_2O_3$ | 0.30 | 0.30 | 6.60 | 1.02 | 1.01 | 1.02 | 3.10 | 2.40 | 0.71 |
| $Li_2O$ | 0.00 | 0.00 | 0.00 | 0.00 | 0.00 | 0.00 | 0.00 | 0.00 | 0.02 |

TABLE 1-continued

|  | No. 1 | No. 2 | No. 3 | No. 4 | No. 5 | No. 6 | No. 7 | No. 8 | No. 9 |
|---|---|---|---|---|---|---|---|---|---|
| $Na_2O$ | 0.00 | 0.00 | 0.00 | 0.00 | 0.00 | 0.00 | 0.00 | 0.00 | 0.00 |
| $K_2O$ | 0.00 | 0.00 | 0.00 | 0.00 | 0.00 | 0.00 | 0.00 | 0.00 | 0.00 |
| MgO | 3.57 | 3.57 | 2.50 | 3.59 | 3.58 | 3.60 | 4.88 | 5.07 | 3.34 |
| CaO | 3.09 | 3.09 | 6.30 | 3.52 | 3.51 | 3.95 | 1.87 | 4.38 | 4.60 |
| SrO | 3.16 | 3.16 | 0.51 | 3.18 | 2.41 | 2.43 | 7.23 | 7.04 | 1.52 |
| BaO | 8.68 | 8.68 | 5.69 | 7.61 | 8.70 | 7.64 | 5.69 | 0.06 | 8.75 |
| $SnO_2$ | 0.22 | 0.22 | 0.22 | 0.22 | 0.22 | 0.22 | 0.22 | 0.22 | 0.22 |
| $Fe_2O_3$ (ppm) | 97 | 88 | 105 | 100 | 86 | 99 | 108 | 100 | 103 |
| $Fe_2O_3$ (ppm) from Mg and Ca raw materials | 58 | 59 | 41 | 44 | 48 | 56 | 51 | 55 | 40 |
| RO | 18.50 | 18.50 | 15.00 | 17.91 | 18.20 | 17.62 | 19.67 | 16.55 | 18.21 |
| $RO/Al_2O_3$ | 0.95 | 0.95 | 0.78 | 0.92 | 0.94 | 0.90 | 1.09 | 0.85 | 0.95 |
| Property |  |  |  |  |  |  |  |  |  |
| α 30-380 (×$10^{-7}$/° C.) | 38.5 | 38.5 | 37.8 | 38.1 | 38.3 | 38.0 | 37.7 | 38.7 | 39.2 |
| β-OH ($mm^{-1}$) | 0.12 | N.A. | N.A. | N.A. | 0.10 | N.A. | N.A. | N.A. | 0.09 |
| Compaction rate (ppm) | 9 | N.A. | 19 | N.A. | N.A. | N.A. | 17 | N.A. | N.A. |
| Transmittance at 308 nm (%) | 74 | 75 | 73 | 75 | 77 | 74 | 73 | 74 | 73 |
| Ps (° C.) | 761 | 761 | 700 | 750 | 750 | 750 | 718 | 713 | 750 |
| Ta (° C.) | 819 | 820 | 755 | 808 | 809 | 808 | 777 | 768 | 808 |
| Ts (° C.) | 1,054 | 1,053 | 984 | 1,041 | 1,042 | 1,040 | 1,020 | 994 | 1,041 |
| $10^{4.5}$ dPa·s (° C.) | 1,315 | 1,312 | 1,235 | 1,297 | 1,299 | 1,298 | 1,235 | 1,235 | 1,296 |
| $10^{4.0}$ dPa·s (° C.) | 1,377 | 1,374 | 1,294 | 1,358 | 1,361 | 1,360 | 1,348 | 1,292 | 1,357 |
| $10^{3.0}$ dPa·s (° C.) | 1,540 | 1,537 | 1,447 | 1,517 | 1,523 | 1,522 | 1,511 | 1,443 | 1,519 |
| $10^{2.5}$ dPa·s (° C.) | 1,643 | 1,643 | 1,548 | 1,622 | 1,628 | 1,626 | 1,616 | 1,541 | 1,622 |
| TL (° C.) | 1,231 | 1,246 | 1,123 | 1,239 | 1,240 | 1,240 | 1,173 | 1,215 | 1,232 |
| Logη at TL (dPa·s) | 5.28 | 5.11 | 5.60 | 5.04 | 5.05 | 5.04 | 5.58 | 4.70 | 5.10 |

TABLE 2

|  | No. 10 | No. 11 | No. 12 | No. 13 | No. 14 | No. 15 | No. 16 | No. 17 |
|---|---|---|---|---|---|---|---|---|
| Composition (mass %) |  |  |  |  |  |  |  |  |
| $SiO_2$ | 61.41 | 61.91 | 64.10 | 61.76 | 61.67 | 61.10 | 61.70 | 61.00 |
| $Al_2O_3$ | 19.00 | 19.16 | 16.90 | 19.05 | 19.02 | 18.60 | 15.80 | 17.20 |
| $B_2O_3$ | 0.71 | 0.72 | 0.30 | 0.71 | 0.71 | 0.67 | 0.04 | 3.00 |
| $Li_2O$ | 0.02 | 0.02 | 0.00 | 0.00 | 0.00 | 0.00 | 0.00 | 0.00 |
| $Na_2O$ | 0.00 | 0.00 | 0.00 | 0.00 | 0.00 | 0.00 | 0.01 | 0.01 |
| $K_2O$ | 0.00 | 0.00 | 0.00 | 0.00 | 0.00 | 0.00 | 0.00 | 0.00 |
| MgO | 3.09 | 3.35 | 1.80 | 3.12 | 3.11 | 3.20 | 0.06 | 1.10 |
| CaO | 4.90 | 4.69 | 5.90 | 4.91 | 4.90 | 5.11 | 8.69 | 7.44 |
| SrO | 0.60 | 1.83 | 0.80 | 0.61 | 0.30 | 0.62 | 1.89 | 1.28 |
| BaO | 10.05 | 8.10 | 10.00 | 9.62 | 10.06 | 10.40 | 11.30 | 8.73 |
| $SnO_2$ | 0.22 | 0.22 | 0.22 | 0.22 | 0.22 | 0.22 | 0.22 | 0.21 |
| $Fe_2O_3$ (ppm) | 89 | 97 | 92 | 85 | 110 | 102 | 90 | 104 |
| $Fe_2O_3$ (ppm) from Mg and Ca raw materials | 51 | 42 | 58 | 60 | 44 | 51 | 39 | 50 |
| RO | 18.64 | 17.97 | 18.50 | 18.26 | 18.38 | 19.33 | 21.94 | 18.55 |
| $RO/Al_2O_3$ | 0.98 | 0.94 | 1.09 | 0.96 | 0.97 | 1.04 | 1.39 | 1.08 |
| Property |  |  |  |  |  |  |  |  |
| α 30-380 (×$10^{-7}$/° C.) | 39.6 | 39.1 | 38.8 | 39.0 | 39.1 | 39.4 | 45.8 | N.A. |
| β-OH ($mm^{-1}$) | 0.04 | 0.08 | N.A. | 0.15 | 0.07 | 0.05 | 0.05 | 0.14 |
| Compaction rate (ppm) | N.A. | N.A. | 14 | N.A. | 11 | 10 | 12 | 16 |
| Transmittance at 308 nm (%) | 76 | 75 | 74 | 76 | 73 | 74 | 78 | 75 |
| Ps (° C.) | 750 | 750 | 756 | 750 | 751 | 751 | 749 | N.A. |
| Ta (° C.) | 809 | 808 | 814 | 809 | 809 | 809 | 807 | N.A. |
| Ts (° C.) | 1,042 | 1,041 | 1,061 | 1,043 | 1,044 | 1,042 | 1,034 | N.A. |
| $10^{4.5}$ dPa·s (° C.) | 1,299 | 1,296 | 1,335 | 1,300 | 1,301 | 1,301 | 1,299 | N.A. |
| $10^{4.0}$ dPa·s (° C.) | 1,360 | 1,357 | 1,401 | 1,362 | 1,362 | 1,362 | 1,364 | N.A. |
| $10^{3.0}$ dPa·s (° C.) | 1,521 | 1,520 | 1,574 | 1,524 | 1,524 | 1,526 | 1,537 | N.A. |
| $10^{2.5}$ dPa·s (° C.) | 1,623 | 1,625 | 1,685 | 1,628 | 1,628 | 1,633 | 1,650 | N.A. |
| TL (° C.) | 1,220 | 1,236 | 1,226 | 1,220 | 1,230 | 1,218 | 1,203 | N.A. |
| Logη at TL (dPa·s) | 5.25 | 5.06 | 5.50 | 5.26 | 5.16 | 5.27 | 5.38 | N.A. |

First, a glass batch blended so as to achieve a glass composition and a β-OH value shown in the tables was loaded in a small test melting furnace formed of zirconia electrocast bricks, and then melted at from 1,600° C. to 1,650° C. by heating through application of a current with a molybdenum electrode without heating with a combustion flame of a burner. Thus, molten glass was obtained. Subsequently, the molten glass was fined through use of a Pt—Rh vessel, stirred, and then supplied to a zircon forming body and formed into a flat sheet shape having a thickness of 0.5 mm by an overflow down-draw method. The resultant glass sheet was evaluated for an average thermal expansion coefficient α within a temperature range of from 30° C. to 380° C., a β-OH value, a thermal compaction rate (Compaction rate), an internal transmittance at a wavelength of 308 nm in a thickness direction (Transmittance at 308 nm), a strain point Ps, an annealing point Ta, a softening point Ts, a temperature at a viscosity of $10^{4.5}$ poise, a temperature at a viscosity of $10^{4.0}$ poise, a temperature at a viscosity of $10^{3.0}$ poise, a temperature at a viscosity of $10^{2.5}$ poise, a liquidus temperature TL, and a viscosity at a liquidus temperature log ηTL. The content of iron derived from the raw material for introducing MgO and the raw material for introducing CaO was obtained as described below. The raw material was dissolved in an appropriate acid, and then the amount of iron in the raw material was measured with an ICP optical emission spectrometer, and the content of iron was calculated based on the glass composition.

The average thermal expansion coefficient α within a temperature range of from 30° C. to 380° C. is a value measured with a dilatometer.

The β-OH value is a value measured by the above-mentioned method.

The thermal compaction rate is calculated as described below. First, a sample is marked with a linear mark at a predetermined position, and then bent perpendicular to the mark to be divided into two glass pieces. Next, one of the glass pieces is subjected to predetermined heat treatment (the glass piece is increased in temperature from normal temperature at a rate of 5° C./min, kept at a temperature of 500° C. for a time of 1 hour, and decreased in temperature at a rate of 5° C./min). After that, the glass piece having been subjected to the heat treatment and another glass piece not having been subjected to the heat treatment are arranged next to each other, and are fixed with an adhesive tape T. Then, a shift between the marks is measured. The thermal compaction rate is calculated by the expression $\Delta L/L_0$ (unit: ppm) when the shift between the marks is represented by $\Delta L$ and the length of the sample before the heat treatment is represented by $L_0$.

The internal transmittance at a wavelength of 308 nm in the thickness direction is a value measured with UV-3100PC manufactured by Shimadzu Corporation.

The strain point Ps, the annealing point Ta, and the softening point Ts are values measured in accordance with methods specified in ASTM C336 and C338.

The temperatures at viscosities at high temperature of $10^{4.5}$ dPa·s, $10^{4.0}$ dPa·s, $10^{3.0}$ dPa·s, and $10^{2.5}$ dPa·s are values measured by a platinum sphere pull up method.

The liquidus temperature TL is a value obtained by measuring a temperature at which a crystal (initial phase) precipitates when glass powder which has passed through a standard 30-mesh sieve (sieve opening: 500 μm) and remained on a 50-mesh sieve (sieve opening: 300 μm) is placed in a platinum boat and kept for 24 hours in a gradient heating furnace.

The liquidus viscosity $\log_{10}$ ηTL is a value obtained by measuring a glass viscosity at the liquidus temperature TL by a platinum sphere pull up method.

As apparent from Tables 1 and 2, each of Sample Nos. 1 to 17 had a β-OH value of 0.15/mm or less, a content of iron in glass in terms of $Fe_2O_3$ of from 85 ppm by mass to 110 ppm by mass, and an internal transmittance at a wavelength of 308 nm in the thickness direction of from 73% to 78%. Therefore, it is considered that each of Sample Nos. 1 to 17 is suitable as a carrier glass for carrying an organic resin substrate.

The invention claimed is:

1. A carrier glass for carrying an organic resin substrate, wherein the carrier glass has a flat sheet shape having a thickness of from 0.1 mm to 1.2 mm,
   wherein the carrier glass has a content of iron in glass in terms of $Fe_2O_3$ of from 45 ppm by mass to 130 ppm by mass,
   wherein the carrier glass has a transmittance at a wavelength of 308 nm in a thickness direction of from 71% to 81%,
   wherein the carrier glass has a ratio of (MgO+CaO+SrO+BaO)/$Al_2O_3$ in terms of mass % of from 0.90 to 1.40,
   wherein the carrier glass has a specific Young's modulus that is greater than 29.5 GPa/g·cm$^{-3}$, and
   wherein the carrier glass comprises as a glass composition, in terms of mass %, 0% to 6% of $B_2O_3$, and 0% to 6% of MgO, and is free of $P_2O_5$.

2. The carrier glass according to claim 1, wherein the carrier glass has a content of $Li_2O+Na_2O+K_2O$ in a glass composition of less than 0.20 mass %.

3. The carrier glass according to claim 1, wherein the carrier glass has a β-OH value of 0.20/mm or less.

4. The glass carrier glass according to claim 1, wherein the carrier glass comprises as a glass composition, in terms of mass % on a basis of the following oxides, 55% to 65% of $SiO_2$, 15% to 23% of $Al_2O_3$, 0% to 6% of $B_2O_3$, 0% to less than 0.20% of $Li_2O+Na_2O+K_2O$, 0% to 6% of MgO, 0.1% to 10% of CaO, 0% to 10% of SrO, 0% to 13% of BaO, 60 ppm to 130 ppm of $Fe_2O_3$, 0% to less than 0.010% of $As_2O_3$, and 0% to less than 0.010% of $Sb_2O_3$.

5. The carrier glass according to claim 1, wherein the carrier glass has a thermal compaction rate of 20 ppm or less when the carrier glass is increased in temperature from normal temperature at a rate of 5° C./min, kept at 500° C. for 1 hour, and decreased in temperature at a rate of 5° C./min.

6. The carrier glass according to claim 1, wherein the carrier glass has a liquidus temperature of 1,300° C. or less.

7. The carrier glass according to claim 1, wherein the carrier glass has a temperature at a viscosity at high temperature of $10^{2.5}$ dPa·s of 1,700° C. or less.

8. A glass-resin laminate, comprising a carrier glass and an organic resin substrate laminated on each other,
   wherein the carrier glass comprises the carrier glass of claim 1.

9. The carrier glass according to claim 2, wherein the carrier glass has a β-OH value of 0.20/mm or less.

10. A glass-resin laminate, comprising a carrier glass and an organic resin substrate laminated on each other,
    wherein the carrier glass comprises the carrier glass of claim 2.

11. A glass-resin laminate, comprising a carrier glass and an organic resin substrate laminated on each other,
    wherein the carrier glass comprises the carrier glass of claim 3.

12. A glass-resin laminate, comprising a carrier glass and an organic resin substrate laminated on each other,
    wherein the carrier glass comprises the carrier glass of claim 4.

13. A glass-resin laminate, comprising a carrier glass and an organic resin substrate laminated on each other,
    wherein the carrier glass comprises the carrier glass of claim 5.

14. A glass-resin laminate, comprising a carrier glass and an organic resin substrate laminated on each other,
    wherein the carrier glass comprises the carrier glass of claim 6.

15. A glass-resin laminate, comprising a carrier glass and an organic resin substrate laminated on each other,
    wherein the carrier glass comprises the carrier glass of claim 7.

16. The carrier glass according to claim 1, wherein the carrier glass has a content of $B_2O_3$ that is 0.72 mass % or less.

17. The carrier glass according to claim 1, wherein the carrier glass has a content of BaO is 7.64 mass % to 13 mass %.

* * * * *